UNITED STATES PATENT OFFICE.

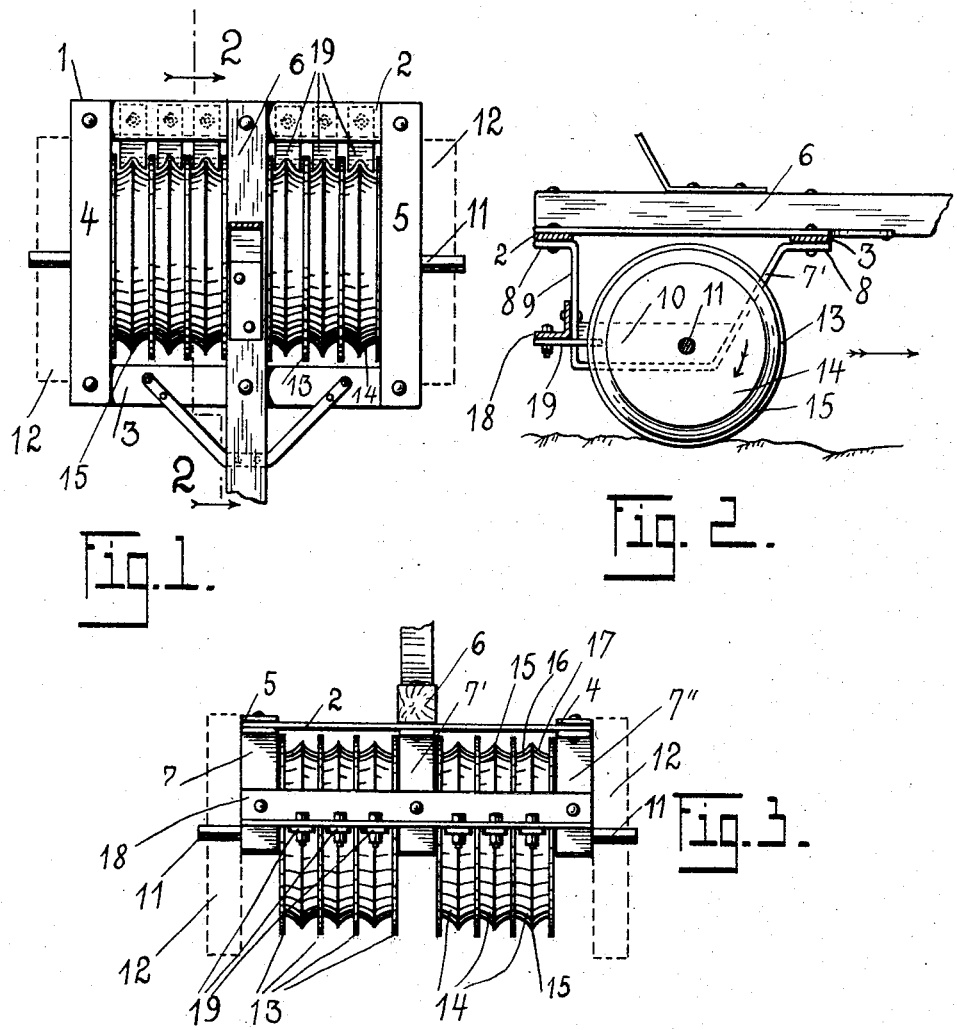

DAVID G. TETER, OF NOKOMIS, ILLINOIS.

COMBINED CLOD CUTTER AND CRUSHER.

1,182,941.  Specification of Letters Patent.  Patented May 16, 1916.

Application filed May 12, 1915. Serial No. 27,565.

*To all whom it may concern:*

Be it known that I, DAVID G. TETER, a citizen of the United States, residing at Nokomis, county of Montgomery, and State of Illinois, have invented certain new and useful Improvements in Combined Clod Cutters and Crushers, of which the following is a specification, reference being had to the accompanying drawings.

This invention relates to a class of agricultural implements commonly known as clod crushers, and has for its object to construct a crusher wherein the associated parts are of simple construction and very easily replaced, yet the machine, when assembled, present an economical and durable apparatus.

Another object of the present invention is to provide a machine which can be used as either a clod crusher or a sod cutter.

A still further object is to provide a machine of the character mentioned with scrapers which are associated with the cutting apparatus to effectually keep the cutters and crushers cleaned so as to always present them in their most efficient condition.

With these and other objects in view, which will present themselves to persons skilled in the art, this invention resides in the novel features of construction, formation, combination and arrangement of parts to be hereinafter more fully described, pointed out in the appended claims and illustrated in the accompanying drawings in which—

Figure 1 is a top plan view, Fig. 2 is a section on line 2—2, Fig. 1 looking in the direction as indicated by the arrows, and Fig. 3 is a rear elevation.

Referring to the drawings, the numeral 1 designates a frame, which consists of front and rear bars 2—3, said bars being connected by side bars 4—5, and an intermediate bar 6. Secured to the under side of the front and rear bars are three hangers 7—7' and 7" of substantially U shape form, the ends of each hanger are bent, as indicated at 8, to provide a bearing for securing the hangers in position. One side of each hanger is made vertical as indicated in the drawings at 9 to provide a suitable place for the scraper attachment hereinafter referred to. Each of the hangers is provided with boxes 10—10' and 10" for supporting the transverse shaft 11, said shaft extending beyond the end hangers, 10 and 10" a sufficient distance to provide stub axles which are adapted to receive wheels 12, shown in dotted lines Fig. 1, when it is desired to elevate the cutting blades so that the machine may be moved from field to field.

Rotatably mounted upon the shaft 11 are a plurality of circular cutting blades 13, the number of which may be raised to suit the desire of the operator. Located between the cutting blades 13 and also rotatably mounted upon the transverse shaft are crushing members 14, each of which have a centrally projecting peripheral rib 15. From the rib to the sides of each crusher member are concaved portions 16—17. The diameter of the crushing members is slightly less than that of the cutting blades for a purpose hereinafter pointed out.

Secured to the vertical side 9 of the three hangers and arranged transversely thereof is an angle bar 18, to the horizontal flange of which is secured a plurality of scrapers 19, the forward ends of which are cut out or grooved so as to conform as nearly as possible to the peripheral shape of the crushing members 14. The scrapers are arranged with reference to the cutting and crushing elements of the machine so as to extend between but close to the cutting blades and nearly in contact with the crushing elements.

In operating the machine as a clod crusher it is moved across a plowed field and the large clods are first cut by the blades, thereby reducing them in size until they are small enough to enter between the blades, whereupon the ribs of the crushers then act upon these small clods further reducing the size of the same and as they slide upon the concaved portions of the crushers they are crowded against the side of the cutting blades, which finally reduces the clods. Any tendency for the space between the cutting blades to become clogged or choked will be overcome by the scrapers which being located in this space will remove any dirt or substance remaining therein. Further it will be noted that the machine may be used for cutting sod into strips, owing to the fact that the cutting edge of the blades extend beyond the peripheral edge of the crushers.

What I claim is:

1. A device of the character described, in combination with a frame, of hangers supported by the frame, a shaft supported by the hangers, a plurality of flat cutting disks rotatably mounted upon the shaft, a plurality of crushing members rotatably mounted upon the shaft and between the cutting disks, said crushing members having circumferential ribs formed thereon, the cutting edges of said disks extending beyond the periphery of said ribs and a plurality of grooved scraper blades carried by the hangers and arranged over the crushing members to simultaneously clean the sides of the cutting disks and the periphery of the crushing members.

2. In a device of the character described, in combination with a frame, of substantially U shaped hangers supported by the frame, a shaft supported by the hangers, a plurality of cutting disks rotatably mounted upon the shaft, a plurality of crushing elements rotatably mounted upon the shaft and between the cutting disks, said crushing elements having a central peripheral rib, an angle bar secured to the hangers and scraper blades secured to the angle bar and arranged between the cutting disks and in close proximity to the periphery of the crushing elements, as and for the purpose set forth.

3. In a device of the character described, in combination with a frame, of substantially U shaped hangers supported by the frame, a shaft supported by the hangers, a plurality of flat cutting disks rotatably mountel upon the shaft, a plurality of crushing members rotatably mounted upon the shaft and between the cutting disks, said crushing members having circumferential ribs formed thereon, an angle bar secured to the hangers and a plurality of scraper blades having notched forward portions conforming to the peripheral shape of the crushers secured to the angle bar and arranged between the cutting disks and in close proximity to the edge of the crushing members, as and for the purpose set forth.

In testimony whereof I affix my signature in presence of two witnesses.

DAVID G. TETER.

Witnesses:
FRANK LATHROP,
J. A. WERNER.

Copies of this patent may be obtained for five cents each, by addressing the "Commissioner of Patents, Washington, D. C."